No. 812,636. PATENTED FEB. 13, 1906.
J. G. CALLAN.
VARIABLE STROKE CRANK.
APPLICATION FILED JULY 11, 1904.
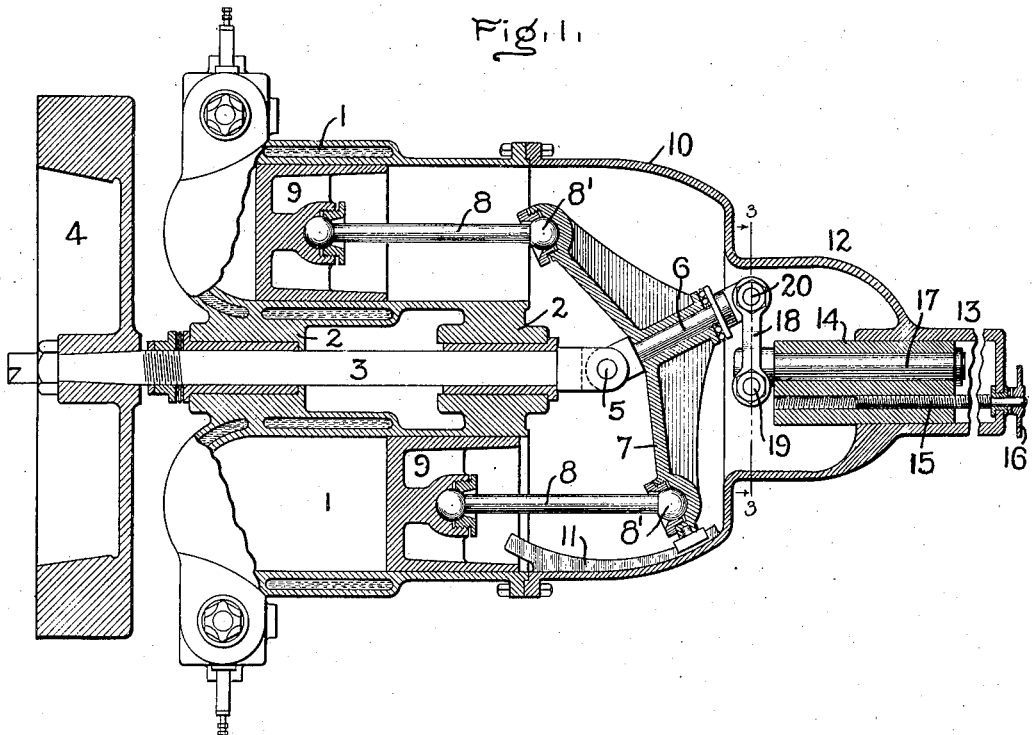
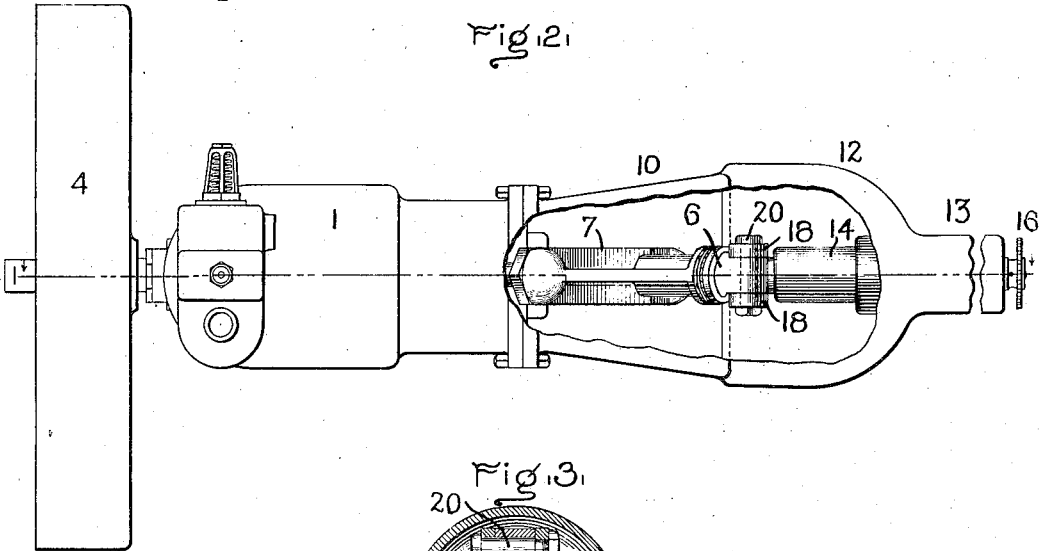
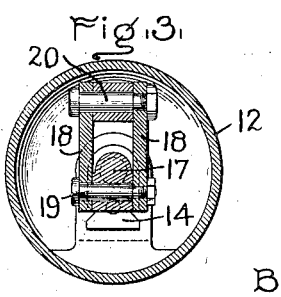
Witnesses:
Inventor,
John G. Callan,
By Albert H. Dain
Att'y

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

VARIABLE-STROKE CRANK.

No. 812,636.   Specification of Letters Patent.   Patented Feb. 13, 1906.

Application filed July 11, 1904. Serial No. 215,991.

*To all whom it may concern:*

Be it known that I, JOHN G. CALLAN, a citizen of the United States, residing at Lynn, county of Essex, State of Massachusetts, have invented certain new and useful Improvements in Variable-Stroke Cranks, of which the following is a specification.

This invention relates to mechanisms for transmitting motion; and its object is to provide means for varying the effective stroke of a crank by which the rectilinear movement of a reciprocating element is caused to impart rotary motion to a shaft.

The invention is especially applicable to engines—such, for instance, as gasolene automobile-engines—for the purpose of varying the stroke of the piston or pistons, and thus regulating the torque of the engine-shaft.

In the accompanying drawings, Figure 1 is a sectional elevation on the line 1 1, Fig. 2, of a two-cylinder explosive-engine equipped with my invention. Fig. 2 is a top plan view of the same, partly broken away. Fig. 3 is a cross-section on the line 3 3, Fig. 1.

The engine shown is merely illustrative, and its structural features form no part of the present invention. The two cylinders 1 are parallel, being conveniently cast integral with the bearings 2 for the main shaft 3, said bearings being between the cylinders, with their axis in the plane of the axes of said cylinders. The front end of the shaft may be provided with a fly-wheel 4, while its rear end is attached by a hinge-joint 5 to a short shaft 6, journaled in the hub of a wabbler 7, which has two arms extending symmetrically on each side of said hub. In each arm is a socket for the ball 8' on the rear end of a connecting-rod 8, whose front end is attached by a similar ball-and-socket joint to the piston 9 in the cylinder 1.

A casing 10 is bolted to the rear end of the cylinders and forms a housing for the wabbler. It is also provided with a stationary guide 11, lying in the plane of the shaft 3 and coöperating with one end of the wabbler to maintain its oscillations in said plane.

The end of the casing is reduced in dimension and altered in shape to form a bell-shaped portion 12, provided with a reduced tubular prolongation 13. In the latter is fitted a slide 14, adapted to move in a line parallel with the axis of the shaft and provided with means for effecting said actuation, preferably a longitudinal screw 15, meshing with a tapped hole in said slide and journaled in the end of the prolongation 13. The projecting end of the screw has a wheel 16 or the like for rotating it to shift the position of the slide.

A shaft 17 is journaled in the slide in alinement with the main shaft 3. On the end adjacent to the wabbler is a crank which is hinged at one end to the shaft and at the other end to the short shaft 6 in the wabbler. The crank is preferably composed of two parallel links 18, standing on each side of the crank-shaft 17 and pivoted thereto by the transverse pin 19. A similar pin 20 attaches the links to the wabbler-shaft 6.

The operation is as follows: When the parts stand in the positions shown in Fig. 1, the crank is at right angles with its shaft 17, and consequently the pistons 9 have their full stroke and exert the greatest torque on the shaft; but if the slide is drawn out, so that the links 18 are compelled to make an angle of less than ninety degrees with the shaft 17 the effective length of the crank is lessened, and the pistons cannot make a full stroke. By retracting the slide far enough the links will straighten out nearly in line with the shafts and the pistons can move but slightly, the torque being reduced almost to zero. By properly locating the joint 19 with reference to the axis of the shaft 17 the movement of the pistons can be stopped completely, which is desirable in some kinds of apparatus, such as pumps.

The invention thus affords a convenient and efficient means for varying the stroke of the pistons from maximum to minimum and correspondingly altering the torque of the shaft.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. The combination with a shaft, of a crank hinged directly thereto, means for actuating said crank, and means for bodily moving the shaft to vary the angle between the said crank and the axis of the shaft.

2. The combination of two rotating shafts, a third shaft hinged to one of them and imparting rotation thereto, and a connecting member hinged to the other rotating shaft and the third shaft, the axes of the hinged connections between the several parts being transverse to the axis of rotation of the shafts.

3. The combination with a crank-shaft, of a crank hinged thereto, means for actuating said crank comprising a member rotating in a given plane, a rotating shaft hinged thereto and axially alining with the crank-shaft, and means for moving said crank-shaft longitudinally, in a line perpendicular to said plane.

4. The combination with a rotating shaft, of a crank hinged thereto, a member connected with said crank and rotating in a plane perpendicular to the axis of the shaft, a slide in which said crank-shaft is journaled, a bearing for the slide and shaft, and means for reciprocating said slide in the bearing to move the shaft longitudinally.

5. The combination in an engine comprising a wabbler, of a crank-shaft, a slide in which said shaft is journaled, and with which the latter is longitudinally movable, and a crank hinged to said shaft and connected with the wabbler.

6. The combination in an engine comprising a wabbler, of a shaft journaled in the hub of the wabbler, and relatively rotatable therein, a crank-shaft, a slide in which said crank-shaft is journaled, and a crank hinged directly to the crank-shaft and to the wabbler-shaft.

7. The combination of two rotating and axially-alining shafts, a third shaft hinged to one of them and adapted to drive the same, a crank hinged to the other rotating shaft and to the third shaft, and a means for adjusting the relative position of the rotating shafts to change the relation between the crank and the third shaft.

In witness whereof I have hereunto set my hand this 7th day of July, 1904.

JOHN G. CALLAN.

Witnesses:
 DUGALD McK. McKILLOP,
 HENRY O. WESTENDARP.